United States Patent [19]

Watkins et al.

[11] Patent Number: 5,006,405
[45] Date of Patent: Apr. 9, 1991

[54] COATED MICROWAVE HEATING SHEET FOR PACKAGING

[75] Inventors: James D. Watkins, Prior Lake; David W. Andreas; David H. Cox, both of Minneapolis, all of Minn.

[73] Assignee: Golden Valley Microwave Foods, Inc., Eden Prairie, Minn.

[21] Appl. No.: 212,235

[22] Filed: Jun. 27, 1988

[51] Int. Cl.⁵ .................. B32B 5/16; B65D 30/02; B65D 85/00
[52] U.S. Cl. ................... 428/323; 428/408; 428/414; 428/425.1; 428/464; 428/481; 428/452; 428/511; 428/514; 428/530; 428/702; 428/918; 428/34.3; 426/127; 426/113; 383/116; 219/10.55 E; 219/113; 427/383.1
[58] Field of Search ........... 428/323, 408, 414, 425.1, 428/464, 481, 452, 511, 514, 530, 702, 918

[56] References Cited

U.S. PATENT DOCUMENTS

| | | | |
|---|---|---|---|
| 3,220,635 | 11/1965 | Kasting et al. | 229/57 |
| 3,973,045 | 8/1976 | Bramberg et al. | 426/110 |
| 4,190,757 | 2/1980 | Turpin et al. | 219/10.55 E |
| 4,230,767 | 10/1980 | Isaka et al. | 428/349 |
| 4,230,924 | 10/1980 | Brastad | 219/10.55 E |
| 4,264,668 | 4/1981 | Balla | 428/195 |
| 4,267,420 | 5/1981 | Brastad | 219/10.55 E |
| 4,389,438 | 6/1983 | Ohtsuki et al. | 428/35 |
| 4,450,180 | 5/1984 | Watkins | 426/107 |
| 4,518,651 | 5/1985 | Wolfe, Jr. | 428/308.8 |
| 4,553,010 | 11/1985 | Bohrer et al. | 219/10.55 E |
| 4,555,605 | 11/1985 | Brown et al. | 219/10.55 E |
| 4,641,005 | 2/1987 | Seiferth | 219/10.55 E |
| 4,678,882 | 7/1987 | Bohrer et al. | 219/10.55 E |
| 4,713,510 | 12/1987 | Quick et al. | 219/10.55 E |
| 4,735,513 | 4/1988 | Watkins et al. | 383/116 |
| 4,804,582 | 2/1989 | Noding et al. | 428/332 |
| 4,864,089 | 9/1989 | Tighe | 219/10.55 E |

Primary Examiner—P. C. Sluby
Attorney, Agent, or Firm—James V. Harmon

[57] ABSTRACT

A coating sheet material is provided for wrapping, packaging or shipping food articles that are to be heated in a microwave oven. The sheet is formed from a paper or paperboard backing which is thermally and dimensionally stable when exposed to microwave energy. On at least one surface is provided a smooth supercalendared surface or the sheet is treated by processing as with a filler coating to fill the voids between the paper fibers and to thereby present a smooth surface. A microwave interactive layer is applied to the smoothed surface from a fluid or vapor state. The interactive coating can comprise carbon, a semiconductive metal coating or other microwave interactive material.

22 Claims, 1 Drawing Sheet

COATED MICROWAVE HEATING SHEET FOR PACKAGING

FIELD OF THE INVENTION

The present invention relates to sheet material and more particularly to coated sheets that are useful in packaging and shipping products.

BACKGROUND OF THE INVENTION

The present invention is concerned with the problem of providing coated paper which can be used in sheet form or in the form of a bag or other container for heating articles in a microwave oven. Many products have been proposed for browning, searing or otherwise heating the surface of an article within a microwave oven. These prior products can be divided into three groups: rigid; semi-flexible or having limited flexibility; and flexible. Rigid heating containers are exemplified by the following U.S. Pat. Nos.: 4,266,108; 4,184,061; 4,450,334; 4,398,077; 4,166,208; 4,158,760; and 4,320,274. Among these, U.S. Pat. No. 4,266,108 describes a reflective metal plate such as an aluminum plate to which a layer of lossy materials, e.g. magnetic oxides known as ferrites, have been applied. These materials are bonded to the reflective metal plate which can be aluminum by means of an intermediate layer containing a binder or an air gap. U.S. Pat. No. 4,184,061 describes a glass ceramic browning vessel with a metallic oxide coating on its lower surface. U.S. Pat. No. 4,450,334 is similar, except that in this case a plastic layer containing a ferrite is applied to the bottom surface of an aluminum dish. In U.S. Pat. No. 4,398,077 a ceramic or glass dish is described having a resistive film 14 of tin oxide applied to its lower surface. Both of U.S. Pat. Nos. 4,166,208 and 4,158,760 describe rigid conical containers formed from plastic. The lower end of each cone is in contact with the support member such as a block of plastic which is made lossy by the inclusion of metal or carbon particles. U.S. Pat. No. 4,320,270 describes a cooking utensil in the form of a dielectric dish, e.g., glass or plastic, having a metal layer extending through it.

Among references describing flexible packaging materials is U.S. Pat. No. 4,190,757 which describes a supporting substance in the form of aluminum foil which may be as little as one mil in thickness to which a paint-like layer of a ferrite or other lossy material is applied as a coating. For example, a wet mixture of taconite, sand and sodium silicate are blended and applied by brushing and rolling the composition onto a sheet of three mil aluminum to a thickness of 0.03 inches. The resulting laminate is fairly thick (over 30 mils in thickness) and is difficult to handle with automated roll stands and other equipment used for winding, rolling, cutting, transferring and forming sheet material into packages. Moreover, the laminate is heavy and the ferrite coating sometimes tends to flake off when the underlying aluminum sheet is bent or flexed.

U.S. Pat. Nos. 4,267,420 and 4,230,924 describe the use of thin carrier sheets comprising flexible polyester plastic films or laminates of polyester and polyethylene to which a thin semiconductive metal coating is applied. The carrier sheet can, if desired, be bonded to paperboard. U.S. Pat. Nos. 4,553,010, 4,555,605, 4,641,005, 4,678,882 and 4,735,513 show other coated sheets and laminates in which a microwave interactive material is supported upon or dispersed within a carrier sheet formed from plastic.

By contrast with the prior art, a major objective of this invention is to find an effective means for applying microwave interactive coatings to a paper or paperboard backing, for convenience referred to herein simply as "paper", without the use of a separate sheet of metal foil or plastic film as a support or carrier for the interactive layer. Thus, in accordance with the prior art, an interactive substance such as metal, metal oxide, carbon, etc., is either deposited upon a separate plastic carrier sheet, e.g. polyester, or distributed within a film of plastic, e.g. polyethylene or polyethylene tetrathalate, which is in turn bonded to a paper backing sheet. In the work leading to the development of the present invention it was found that when a microwave interactive material, such as an electrodeposited metal layer or carbon, is applied to paper directly there is a tendency for sparking, popping, arcing and burning to occur when the sheet is exposed to microwave energy. This is of course unacceptable.

One major objective of the invention is to find a way to eliminate the separate plastic sheet used previously as a carrier for the microwave interactive material. Another object is to provide a novel coated sheet material having a cellulose backing coated with a microwave interactive material in such a way that the interactive material will uniformly heat a product, e.g. a food packaged in the sheet material without causing excessive arcing, sparking, popping, scorching or burning of the cellulose sheet material when exposed to microwave energy in a microwave oven.

It is a more specific objective of the present invention to provide an improved cellulose sheet suited for packaging purposes and for producing heat in a microwave oven that does not require a separate plastic sheet functioning as a carrier for microwave interactive material that has to be laminated to the cellulose sheet but which has the following characteristics and advantages:

(a) the ability to absorb microwave energy and transfer the absorbed energy to products in a microwave oven during a heating process without sparking, shrinking, burning, shriveling or disintegrating;

(b) the ability to perform satisfactorily although portions of the sheet extend away from and out of heat transfer relationship with the product being heated;

(c) the ability to carry out heating in certain selected areas and not in others;

(d) the provision of areas of any selected shape such as rectangular, triangular, hexagonal, circular areas, etc., that are capable of heating while other surrounding areas of a flexible sheet have no heating function.

(e) provisions which make possible printing all coating layers, including microwave interactive material, onto a paper backing using a commercially available printing press.

These and other more detailed and specific objects and advantages of the invention will become apparent in view of the following detailed description and accompanying drawings which set forth by way of example certain illustrative embodiments of the invention.

THE FIGURES

SUMMARY OF THE INVENTION

Figure 1:
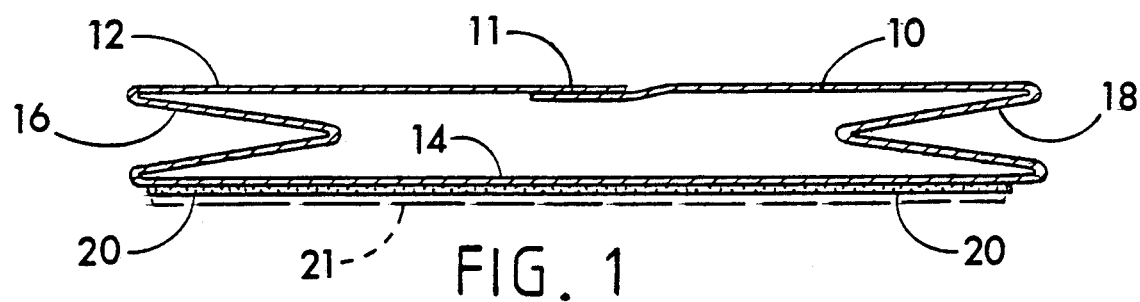
FIG. 1 is a semidiagrammatic cross-sectional view of a typical container utilizing sheet material in accordance with the invention.

Briefly, the invention provides a flexible sheet structure formed from a backing sheet composed of a microwave transparent cellulosic sheet of paper or paperboard upon which is provided one or more areas coated with a microwave coupling material that absorbs microwave energy and becomes hot when exposed to microwave energy. When applied to the surface of an article, e.g. food, to be heated, the article will absorb heat by conduction from the sheet in selected areas where the layer of microwave coupling material is provided but the sheet will allow the product to heat by direct microwave exposure through the flexible sheet material in uncoated areas. The coupling layer can comprise a coating applied from a fluid, e.g. liquid, state such as an ink or if desired a layer deposited by vacuum electrodeposition or electroplating.

More specifically, in one preferred embodiment of the invention the sheet structure comprises a backing sheet of paper or paperboard material transparent to microwaves rendered sufficiently free of discontinuities to be coated with a heating layer that will not arc, pop or burn under normal microwave heating of food. This can be accomplished in several ways, e.g. by supercalendering the paper until glossy or by the application of a filler coating to fill the voids between the fibers in the paper. After harmful discontinuities are removed, a coating of microwave-absorbing coupling, i.e. heating, material is applied to the exposed surface of the sheet. In one form of the invention a cellulosic backing sheet such as paper, cardboard or paperboard is coated with a clay filler coating and then with a pore-sealing coating which is in turn coated with a microwave interactive heating layer. In another form, paper is coated with the interactive layer directly and then coated with a heat insulating layer.

In one form of the invention the area of the interactive layer is the same size and shape as the paper while in another form of the invention the coated area of the sheet is smaller than the sheet of paper o paperboard and its size and shape are carefully selected to produce special benefits.

The coated area may be of any selected shape, such as rectangular, triangular, circular, etc., but is usually the shape of the food product or other product to be heated. For example, if the product being heated is a hamburger patty, a coated patch or island of microwave coupling material will have the shape and size of the hamburger patty and can be placed directly beneath it. The uncoated portions of the sheet surrounding the coated patch can be folded up around the sides of the food or sealed to a similar sheet which lies in contact with the top surface of the food product.

By contrast with the prior art, the sheet material of the present invention requires no separate plastic carrier and laminating operation wherein a layer of plastic sheet material is pressed or bonded onto the paper backing. In a typical situation the sheet material of the present invention is placed around a food product such as a hamburger patty, french fries, etc., and is heated in a microwave oven for 4 to 6 minutes. After heating, the sheet material remains intact and is not damaged or discolored as a result of sparking or burning. Moreover, heat is transferred very effectively to the food or other product and in spite of the high temperature reached, the paper is not usually discolored, charred or otherwise damaged during the heating process. This effectiveness is primarily due to the smooth surface substantially free of pores or other discontinuities provided for the interactive heating coat.

Islands or patches of various shapes can be printed onto the paper backing using commercially available printing presses. The islands or patches of microwave coupling material should have the same size and shape as the food or other product being heated and be in contact with the food more or less uniformly in order to prevent damage to the sheet due to overheating in localized areas.

DESCRIPTION OF THE PREFERRED EMBODIMENTS

Refer now to the Figures which illustrate one embodiment of the invention and the method used for forming it.

Islands or patches of microwave coupling material which become hot when exposed to microwave energy comprise a coating applied from a fluid state such as an ink or by electrodeposition as a metallic film. FIG. 1 illustrates one preferred form of the invention. In FIG. 1 is shown a sheet of paper 10, e.g. 50-lb/ream kraft paper which is preferably supercalendared. When it is employed, the optional supercalendaring operation renders the sheet smooth and substantially free of surface discontinuities at least on its outside (lower) surface. The sheet 10 is folded and suitably sealed to itself by means of an adhesively bonded lap joint 11 to form a container, in this case a paper bag having a front panel 12 and a rear panel 14 joined together by centrally deflected gussets 16 and 18. The paper 10 is heat stable within the temperature range of operation.

Applied to the outside surface of the bottom wall or bottom panel 14 is a coating that may consist of one or more layers. In any event there is at least one coating 20 of a microwave interactive heating substance of the type which will become hot in a microwave oven and will transmit heat by conduction through the paper panel 14 to a food product (not shown) within the container. The coating 20 is applied while in a fluid or vapor state to the outside surface of the panel 14 and is then allowed to cure or set. Coating 20 can be applied in any suitable manner, as by means of spraying, brushing, roll coating or printing, and prior to application will have the fluid or semi-fluid consistency of a printing ink and after it is applied will cure in situ. It can be seen that the coating 20 extends into proximity with the side edges of the panel 14 but need only be large enough to coincide approximately with the edges of the food product contained in the package. As seen from the outside of the package, the coating 20 is a patch which can have any suitable outline. For example, it can be circular, rectangular, square or have a special shape, i.e. a predetermined perimeter shape specifically determined to correspond with the shape of the food product in the package.

The coating 20 can comprise any known coating material adapted to interact with microwave energy and to become heated through the interaction. For example, the coating 20 can comprise a matrix or coating base containing carbon particles or carbon fibers or, if desired, metal particles such as aluminum, copper, zinc, nickel, iron, chromium or a metal oxide such as iron oxide, aluminum oxide or tin oxide, or it can comprise any one of a number of ferromagnetic substances known to produce heating when exposed to microwaves. The coating 20 is flexible, non-flaking and is bonded to the surface of the panel 14. It also conforms to the surface contours of panel 14 and, if desired, can be made sufficiently flexible to conform to the contours of the food product (not shown) within the package by bending somewhat to follow its surface irregularities.

In accordance with a preferred optional form of the invention, a second non-heating exterior coating layer 21 is applied by spraying, dipping, roll coating or printing to the outside surface of the coating 20. Coating 21 is a protective coating preferably formed from any suitable substance having heat insulating properties. It is also preferably porous to allow gases, vapors or fumes to pass through it. Two general types of coatings are preferred. First, a mineral based coating such as a clay coating. To achieve porosity, it can contain a foaming agent, e.g. a minor amount of a gas-producing substance such as an acid and a base adapted to react during the coating process to generate carbon dioxide or other gas for producing voids in the coating. A variety of foaming agents will be apparent to those skilled in the art. One suitable foaming agent is a mixture of acetic acid and sodium bicarbonate introduced just prior to the coating operation. A second general type of coating is a porous plastiC resinOus coating such as a foamed polyurethane, polyester, epoxy or other plastic resin. Thus, in general, the coating 21 can comprise any of a variety of flexible coatings preferably having heat insulating and/or infrared reflecting properties. The coating layer 21 can contain other insulating components such as cellulose particles or other bulking agents, e.g. expanded vermiculite and the like.

During manufacture, the first microwave interactive coating 20 is applied to the sheet 10 by spraying, printing, roll-coating, etc. as described above and is then allowed to cure. Next, the protective heat insulating overcoating 21 is applied by any of the same methods, e.g. printing, roll coating and the like, to form a heat insulating barrier over the coating 20. It is then allowed to cure, i.e. to form a stable film as by means of solvent evaporation, oxidation, the inter-reaction of a two-component system, or polymerization. The layer 20 thus serves as a functional layer for picking up energy while the coating 21 is non-interactive with the microwave energy except indirectly as an insulating layer for reducing heat loss.

When the package formed from sheet 10 is placed in a microwave oven and exposed to microwave energy, the coating layer 20 will become intensely hot and the heat will be carried by conduction through sheet 14 to the food product to enhance cooking. As this happens, the flexible overcoating layer 21 can be effective in reducing the loss of heat in two ways; by reducing conduction of heat downwardly and by the reflection of thermal heat back into the package. Layer 21 in this case comprises a flexible coating having pores that extend through it to allow any fumes generated in the coating 20 to be exhausted into the atmosphere. To accomplish this, the sheet 10 is made relatively gas and vapor impervious compared with the coating 21. In this way, it is possible to apply by printing or roll-coating a vapor and gas venting insulating layer 21. If desired, the layer 21 can in the alternative comprise a layer of self-supporting sheet material such as paper, paper-board or synthetic plastic film (50 lb. Kraft paper is typical) bonded, e.g. glued onto the coating 20 to form a three layer sandwich structure or laminate composed of sheet 14, coating 20 and sheet 21 thereby encapsulating the heat producing coating 20 between two self-supporting sheets. When the overcoating layer 21 is porous it will also promote the escape of any fumes, gas or vapors from the intensely hot layer 20 while it is performing the heat insulating function thereby reducing the loss of heat from the package and thus intensify the heating effect achieved by the coating 20. This improves the heating of food within the package by heating the contents more quickly and to a higher temperature.

Figure 2:
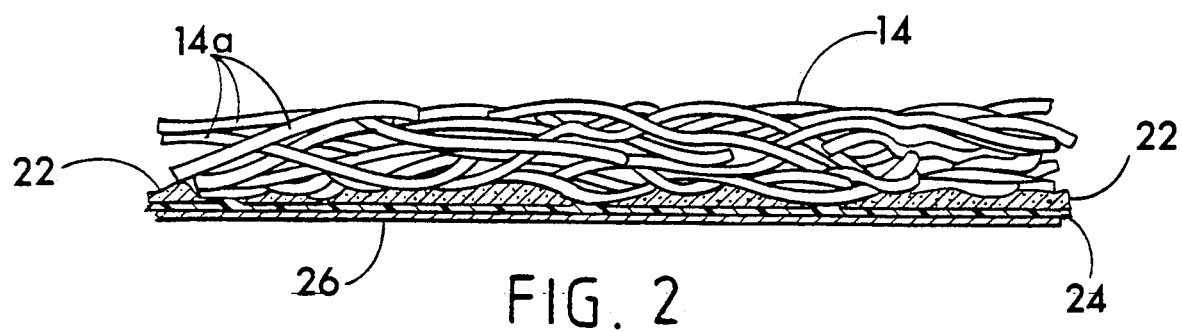
FIG. 2 is a highly magnified or microscopic view of coated sheet material in accordance with another form of the invention.

Refer now to FIG. 2 which illustrates a highly magnified or microscopic cross-sectional view of another panel 14 in accordance with the invention. The panel 14 includes a suitable microwave transparent, thermally and dielectrically stable sheet, i.e. dimensionally stable when heated in a microwave oven, e.g. paper, to which is applied a surface filler coating 22 that fills in the irregularities and interstices between the fibers 14a of the panel 14. The support sheet or panel 14 is typically a sheet of 10 to 80-pound per ream kraft paper optionally provided with a grease-proofing agent. The surface filler coating 22 can be a clay coating preferably applied as a fluid or semi-fluid state, typically an aqueous dispersion, by roll coating, knife coating, spraying, flexographic coating or by other known coating processes to provide a relatively flat exterior surface as shown and to fill in the spaces between the fibers 14a. This gives the coating 22 an irregular thickness. The important characteristics of coating 22 are flexibility, the ability to fill in voids between the fibers 14a and the provision of a smooth exterior surface. Clay coating compositions per se are well known in the art of paper coating. The filler coating 22, whether of clay or other materials, can if desired be made to have heating characteristics in a microwave oven.

Applied to the exterior surface of coating 22, either directly or over an intermediate layer 24, is a microwave interactive heat producing coating 26. While the interactive coating 26 can be applied directly to the relatively flat exposed surface of the coating 22, it is preferably applied to the exposed surface of a second coating 24. The second coating 24 is composed of an initially relatively much more fluid coating material with good leveling properties to produce a smooth and usually glossy, more impervious surface which makes the relatively permeable clay coating 22 more impermeable. The second coating 24 can be thought of as a pore-sealing coating for producing a continuous, uninterrupted exposed surface. It is to the exposed surface of the pore-sealing coat 24 that the microwave interactive heating layer 26 is preferably applied. Since the layer 24 is continuous, uninterrupted and has a smooth glossy surface, the coating 26 can be applied very uniformly and without breaks, fissures or discontinuities, e.g. pinholes and cracks therein. It appears that the presence of such cracks and pinholes was responsible in the past for unacceptable heating properties. However, by using an undercoating 22 or 24 with a smooth exterior surface, the microwave interactive coating, e.g. an interactive ink or lacquer type coating applied from a fluid state or a vapor-deposited oxide or metal, the finished coating will be continuous, uniform and uninterrupted. As a result, heating can be accomplished without unacceptable arcing, popping or burning. In this way, the surface of the microwave transparent base sheet 14 is prepared so that the microwave interactive layer 26 can be applied so as to have structural characteristics that make it stable and non-arcing during the heating process in the microwave oven. The improvement in performance is believed to be primarily due to the smooth, glossy and pinhole- or pore-free surface presented for the application of the microwave interactive coating 26. This allows a much more uniform coating 26 to be applied to the surface by the methods mentioned above.

The filler coating 22 can comprise any suitable known clay coating such as one comprising an aqueous dispersion of clay and starch or a clay coating having a resin content such as an emulsion modifier of acrylic or styrene butadiene or polyvinyl acetate type or of polyvinyl alcohol or it can be composed entirely of a plastic resinous material. The pore-sealing coat 24 ca comprise any relatively fluid plastic resinous coating having good leveling properties and presenting a relatively impervious and usually glossy exposed surface when cured.

The coatings 22 and 24 can contain any of a variety of resins but thermosetting resins are preferred to thermoplastic resins because of their heat resistance. By thermoplastic is meant a substance that will deform enough to lose its useful properties during use. The term thermosetting is meant a product that will undergo a chemical reaction leading to a state that is relatively infusable during use or sufficiently infusable to retain useful properties when heated during use. For example, coating 24 can be an alkyd-oil base coating. These coatings use a binder of synthetic resin obtained by reacting an alcohol such as glycerine or pentaerytritol with a polybasic acid such as phthalic acid in the presence of a reflux solvent such as xylol to remove the water formed during the reaction. The product can be oil-modified to provide oxidation properties. If desired this synthetic resin can be copolymerized with styrene, vinyl-toluene, acrylic monomers or silicone. Toluene diisocyante may also be reacted with any hydroxyl functionality to form a product known as urethane-alkyd. Physical modification with phenolics or rosin esters is also possible to achieve advantageous properties. An alkyd-vinyl-toluene copolymer solution in toluene is advantageous in coating 24 because such products become dry enough to handle by solvent evaporation. They display excellent holdout on porous substrates and will further oxidize to become somewhat thermosetting. The alkyd coating, e.g. coating 24, is applied by flexography or by roll coating. Curing is then allowed to occur by oxidation and polymerization. It is desirable to reduce or eliminate the use of solvents because they tend to promote greater porosity in the surface of coating 24. If desired, the alkyd coating can be mixed as is known in the coating art with other polymerizing (reactive) resins, e.g. heat reactive urea, melamine resins, for changing the characteristics of the coating layer 24 as required.

Another type of base for coatings 22 and 24 is a phenolic alkyd, i.e. an alkyd resin modified with phenols and aldehydes for the purpose of hardening the alkyd coating. Curing can be accomplished by heating the sheet.

Yet another example is a phenolic resin or phenolic modified resin, i.e. phenol reacted with formaldehyde. This will only cure under heat but certain reacted phenolics are oil soluble and can be used to modify alkyds and other coatings.

Another example is a silicone alkyd. In this case an alkyd resin is reacted with silicone to form a silicone copolymer to give the coating 24 added heat resistance and gloss. The coating is dried by oxidation and polymerization.

Of the above examples the alkyd-melamine and urea formaldehyde modified polymers must be baked, e.g. 200° F. Other examples are oxidizable oils or alkyds reacted with toluene diisocyanate. Other polymers are two-component or moisture cure systems based upon aromatic or aliphatic diisocyanate monomers reacted with hydroxyl functional polymers or oils (two-component systems) or with moisture in the air.

Another example of a suitable base for coatings 22 and 24 is a polyurethane resin formed from the reaction of aromatic or aliphatic diisocyanates with hydroxyl functional polymers applied in a low solvent or solvent-free system from two components which are mixed together just prior to application. The coating 24 is cured by reactive cross-linking and by reaction with moisture in the pre-polymer component of the resin. It is preferred that the use of volatile solvents be minimized because of their tendency to produce minute pores produced in the coating during evaporation.

Still another example of a composition useful in the coating 22 and especially the coating 24 is an epoxy resin formed by the reaction of an epoxide and an amine or polyamide. A 100% solids resin composition is preferred to one containing a solvent. This will assure a glossy, pore-free surface. In one coating, biphenol A-epichlorohydrin polymer in which a terminal epoxy group is catalyzed by an amine or a polyamide.

Another coating is an epoxy-polyester coating in which the internal epoxy functionality is reacted with highly acidic polymers based on chlorendic anhydride.

Other compositions that can be used are silicone resins, preferably those that are solvent-free or low in solvents, again to reduce the presence of pores in the exposed surface.

Still other thermosetting coating resins that will form a thin, relatively non-porous coating will be apparent to those skilled in the art.

The resin can be of a type that is cured rapidly by radiation, such as U.V. radiation, electron beam radiation or by vapor permeation. An example of the former is an acrylic monomer-oligomer mixture containing photoinitiators and sensitizers. For radiation cure, maleic anhydride-styrene polyester is an example. For a vapor permeation cure, high solids urethanes that are catalyzed will cure when exposed to tri-ethyl amine vapors.

Following the application of the pore sealing coat 24 the microwave interactive layer 26 is applied to the exposed surface of the sheet. If the coating 26 is in a fluid state it is applied by spray coating, roll coating or printing or the like. If desired, the coating 26 can be a metallic coating applied by sputtering in a vacuum chamber, that is to say by vacuum electrodeposition to form a thin, uniform, semiconductive metallic layer.

The invention will be better understood by reference to the following examples.

EXAMPLE 1

A sheet 14 comprising 50-pound per ream grease-proof kraft paper is coated with a commercially available clay coating layer 22 used for coating paper to fill in the voids between the paper fibers 14a. The clay coating has the following compositions by weight:

|   | % by weight |
|---|---|
| Starch - | 17 parts by weight |

| | | | % by weight |
|---|---|---|---|
| Clay - | 100 parts by weight | Solids | 55 |
| | | Polyvinyl alcohol | 1 |
| | | Water | 44 |
| | | | 100% |

The clay coating 22 provides a substantially smooth exposed surface. After the clay coating is dried, a layer 24 comprising a 0.5 mil thick pore-sealing coating of 100% solids epoxy resin is applied. The resin coating 24 forms a smooth, glossy, nonporous surface which is then cured by heating to 250° F.

The resulting sheet can then be coated with a suitable known microwave interactive coating. When heated in a microwave oven it will generate a substantial amount of heat with little arcing.

EXAMPLE 2

A laminate is prepared similar to Example 1 except that the clay coating 22 is a commercially available clay coating used for coating paper to which is added 10% of a compatible film-forming acrylic resin emulsion. Next is applied a resin coating 24. The resin coating 24 is a phenolic modified alkyd resin. When heated in a microwave oven, heat is generated in the sheet with minimal arcing. In another sample, an acrylic latex is used in place of the alkyd resin. In a third sample, an alkyd emulsion resin is used in place of the acrylic emulsion to provide an emulsifiable resin binder for the clay coating.

EXAMPLE 3

The sheet 14 comprises a 30-pound per ream greaseproof kraft paper to which is applied a commercially available clay filler coating 22 to present a relatively smooth exposed lower surface. To the filler coating 22 is applied a microwave interactive layer 26 comprising a printing ink vehicle having a 20% content of any of the following microwave interactive particulate (pigment) materials: carbon black, iron particles, aluminum particles, iron oxide particles, stainless steel particles or particles of tin oxide. Resin and pigments are combined to the extent that the critical pigment volume is slightly exceeded, i.e. the pigment volume is great enough so that there is not enough resin to coat every pigment particle. The porosity of the coating increases greatly at this point, sufficiently to enable vapor, gas and fumes produced during heating to escape to the outside rather than penetrating the package and possibly contacting a food product. During use, heat is generated without unacceptable arcing.

EXAMPLE 4

A microwave interactive laminate is prepared as in Example 3 except that an alkyd pore-sealing coat 24 is interposed between the clay coating 22 and the coating 26. The pore-sealing coat 24 comprises an alkyd known as a baking alkyd composed of melamine formaldehyde and/or urea formaldehyde resin. In another sample an epoxy-polyester baking acrylic of the type described above is used. Curing is accomplished by heating to 350° F. In a third sample, a catalyzed urethane resin is used. In this sample, curing is accomplished with triethyl amine vapor permeation. In a fourth sample, maleic anhydride is reacted with styrene to form a polyester resin. The reaction is promoted by radiation comprising infrared radiation, ultraviolet radiation or electron beam radiation. The coating 24 is about 0.5 mils in thickness. It presents a glossy surface and is substantially pinhole-free. The interactive layer 26 generally as described in Example 3 but without the pigment exceeding the critical pigment volume is then applied onto this coating. Results are as in Examples 1-3.

EXAMPLE 5

A laminate is prepared as in Example 4 except that the microwave interactive coating 26 is a coating of a vapor-deposited semiconductive metal layer applied in a vacuum chamber. In separate samples the following semiconductive metal coatings are applied: aluminum, copper, tin, tin oxide, nickel, iron, zinc, chromium and stainless steel. The results are as with previous examples.

EXAMPLE 6

A laminate is prepared as in Example 5 except that a liquid insulation coating 21 comprising a porous clay coating of 2 mils thickness is applied by roll coating over the interactive metal layer 26 and is then dried to provide heat insulation and to reflect infrared radiation inwardly. This laminate retains heat better than Example 5 and the food will reach a higher temperature when heated in a microwave oven.

EXAMPLE 7

A 60-pound per ream supercalandered kraft paper is coated directly with a vacuum electro-deposited semiconductive layer of aluminum. When heated in a microwave oven with food adjacent to the coated sheet, arcing is minimal. In a second sample, a coating of a silicone resin is applied before vacuum coating. In a third sample a baking alkyd as described in Example 4 is substituted for the silicone resin coating.

Many variations of the invention within the scope of the appended claims will be apparent to those skilled in the art once the principles described herein are understood.

What is claimed is:

1. A coated microwave heating sheet for wrapping, packaging or shipping food products that are to be hated thereby in a microwave oven comprising,
   a base sheet formed from a microwave transparent fibrous cellulose sheet that is thermally, dielectrically and dimensionally stable when exposed to microwave energy in a microwave oven,
   preconditioning means for the base sheet selected from (a) a supercalandered surface to render the base sheet glossy or (b) a filler coating to fill voids between said fibers in the cellulosic base sheet form rendering one surface of the base sheet sufficiently smooth and free of discontinuities to allow microwave heating of the coated sheet material without arcing or sparking,
   a microwave interactive heating layer composed of a microwave coupling material applied from a fluid or vapor state as a coating upon said one surface of the base sheet over the preconditioning means,
   said microwave interactive heating layer comprising a microwave interactive composition that becomes hot when exposed to microwave energy to thereby transmit the heat by conduction from the interactive layer to the food product.

2. A coated sheet material for wrapping, packaging or shipping food products that are to be heated in a microwave oven comprising,
   a base sheet formed from a microwave transparent fibrous cellulose sheet that is thermally, dielectrically and dimensionally stable when exposed to microwave energy in a microwave oven,
   preconditioning means comprising a filler coating applied to at least one surface of said sheet to fill the voids between the fibers thereof and to present a smooth exposed surface thereon,
   a microwave interactive heating layer comprising a microwave coupling material applied from a fluid or vapor state as a coating upon said one side of the sheet material over the preconditioning filler coating and forming a solid layer thereon,
   said microwave interactive heating layer comprising a microwave interactive composition that becomes hot when exposed to microwave energy to thereby transmit the heat by conduction from the interactive layer to the food product.

3. The coated sheet of claim 2 wherein the fibrous cellulose layer comprises paper and the surface filler coating comprises a clay coating.

4. The coated sheet of claim 3 wherein the clay coating has a resin content composed of a plastic resinous substance uniformly distributed therethrough.

5. The coated sheet of claim 2 wherein interposed between the microwave interactive layer and the filler coating is a second coating for sealing any pores in the filler coating, said second coating comprising a plastic resinous layer substantially free of pinholes or other surface discontinuities of sufficient size to adversely affect the heating performance of the applied microwave interactive layer in a microwave oven.

6. The coated sheet of claim 5 wherein the pore-sealing coat comprises a plastic resinous composition cured in situ and selected from the group consisting of epoxy resin, epoxy-polyester resin, polyurethane resin, polyester resin, phenolic resin, alkyd resin, alkyd copolymer resin, baking systems composed of an alkyd and urea formaldehyde or melamine formaldehyde, silicone resin and a acrylic resin.

7. The coated sheet of claim 2 wherein the interactive layer contains carbon particles of fibers.

8. The coated sheet of claim 2 wherein the interactive coating is a semiconductive metallic coating.

9. A coated sheet for wrapping, packaging or shipping food articles that are to be heated in a microwave oven comprising a base sheet composed of paper, a preconditioning filler coating comprising at least one layer of a coating material for filling in the interstices between the fibers of the paper and for presenting a surface smoother than the original paper base sheet and being sufficiently free of surface discontinuities so that said coated sheet when finished will allow heating in a microwave oven without objectionable arcing or sparking and a semiconductive microwave interactive coupling layer applied from a vapor state by vacuum deposition onto an exposed surface of the filler coating to provide a semiconductive coating adapted to become hot when exposed to microwave energy in a microwave oven whereby the resulting heat is carried by conduction into the food when the food is in contact with the sheet.

10. The coated sheet of claim 9 wherein the semiconductive layer comprises a member selected from the group consisting of vapor deposited aluminum, vapor deposited zinc, vapor deposited tin, vapor deposited copper, vapor deposited nickel, vapor deposited tin oxide, vapor deposited stainless steel and vapor deposited chromium.

11. The coated sheet of claim 9 wherein the surface filler coat comprises a first coating layer of a relatively high initial viscosity for filling the pores and voids between the fibers of the paper base and a second pore-sealing coating layer is applied to an exposed surface of the first coating layer, and said pore-sealing coating comprises a coating of an initially relatively fluid resinous plastic composition cured in situ to provide a smooth surface sufficiently free of interruptions to allow acceptable microwave heating and the microwave interactive coating is applied to an exposed surface of the pore-sealing coating.

12. The coated sheet of claim 5 wherein the pore-sealing coating comprises an initially fluid, substantially solvent-free resin to produce a cured resin matrix that is thereby substantially free of pores which would otherwise have resulted from the presence of volatile solvent in the coating.

13. The coated sheet of claim 3 wherein the coating applied to the base sheet comprises an initially fluid thermosetting plastic resin.

14. The coated sheet of claim 2 wherein an outer coating layer is applied over the microwave interactive layer from a fluid state in the manner of an ink and is cured to define an outer protective layer covering the microwave interactive layer.

15. The coated sheet of claim 14 wherein the outer protective layer has heat insulating properties.

16. The coated sheet of claim 1 wherein said microwave interactive coating contains free particles or fibers of carbon.

17. The coated sheet of claim 1 wherein the interactive coating comprises a semiconductive metallic coating vapor-deposited thereon.

18. A coated sheet material for wrapping, packaging or shipping food products that are to be heated in a microwave oven comprising,
   a base sheet formed from a microwave transparent fibrous cellulose sheet that is thermally, dielectrically and dimensionally stable when exposed to microwave energy in a microwave oven,
   a microwave interactive heating layer comprising a microwave interactive composition that becomes hot when exposed to microwave energy to thereby transmit the heat by conduction from the interactive layer to the food product, and
   a heat insulating coating layer formed from a coatable heat insulating composition deposited upon said heating layer and cured to form a stable coating thereon for reducing the loss of heat from the interactive layer.

19. The coated sheet material of claim 18 the heat insulating coating layer is a porous layer to provide heat insulating properties and to allow the escape of gas, fumes and vapor from the microwave interactive layer during heating.

20. The coated sheet material of claim 9 wherein the coating is comprised of a thermosetting plastic resin applied as a fluid and cured to form a solid substantially uninterrupted film.

21. The coated sheet material of claim 1 wherein the sheet material is a laminate having a self-supporting sheet bonded onto said microwave interactive layer to form a three-layer sandwich structure thereby encapsulating said microwave interactive coating between the base sheet and the self-supporting sheets.

22. The sheet material of claim 21 said self-supporting sheet is a cellulosic sheet of paper or paperboard.

* * * * *